(12) United States Patent
Ho et al.

(10) Patent No.: US 10,209,569 B2
(45) Date of Patent: Feb. 19, 2019

(54) DISPLAY PANEL AND DISPLAY APPARATUS

(71) Applicant: InnoLux Corporation, Jhu-Nan, Miao-Li County (TW)

(72) Inventors: Yu-Sheng Ho, Jhu-Nan (TW); Mao-Shiang Lin, Jhu-Nan (TW); Hsueh-Wen Li, Jhu-Nan (TW); Ying-Jen Chen, Jhu-Nan (TW)

(73) Assignee: INNOLUX CORPORATION, Jhu-Nan, Miao-Li County (TW)

( * ) Notice: Subject to any disclaimer, the term of this patent is extended or adjusted under 35 U.S.C. 154(b) by 115 days.

(21) Appl. No.: 15/223,503

(22) Filed: Jul. 29, 2016

(65) Prior Publication Data

US 2017/0031212 A1    Feb. 2, 2017

(30) Foreign Application Priority Data

Jul. 31, 2015   (CN) .......................... 2015 1 0461218

(51) Int. Cl.
*G02F 1/1343*   (2006.01)
*G02F 1/1337*   (2006.01)
*G02F 1/1362*   (2006.01)
*G02F 1/1333*   (2006.01)

(52) U.S. Cl.
CPC .. *G02F 1/133707* (2013.01); *G02F 1/133345* (2013.01); *G02F 1/134309* (2013.01); *G02F 1/136286* (2013.01); *G02F 2201/123* (2013.01)

(58) Field of Classification Search
None
See application file for complete search history.

(56) References Cited

U.S. PATENT DOCUMENTS

| 2011/0141421 | A1* | 6/2011 | Lee | G02F 1/134309 349/138 |
|---|---|---|---|---|
| 2011/0249229 | A1* | 10/2011 | Kubota | G02F 1/133707 349/141 |
| 2013/0128207 | A1* | 5/2013 | Nakano | G02F 1/1343 349/141 |
| 2014/0184991 | A1* | 7/2014 | Lan | G02F 1/134309 349/96 |
| 2014/0267994 | A1* | 9/2014 | Ryu | G02F 1/133707 349/141 |
| 2016/0139468 | A1* | 5/2016 | Kim | G02F 1/134309 349/43 |
| 2017/0131597 | A1* | 5/2017 | Tsao | G02F 1/134309 |

* cited by examiner

*Primary Examiner* — Richard H Kim
(74) *Attorney, Agent, or Firm* — Muncy, Geissler, Olds & Lowe, P.C.

(57) ABSTRACT

A display panel includes a first substrate, a second substrate, a display medium layer disposed between the first substrate and the second substrate, a first metal layer, a first insulation layer disposed on the first metal layer, a second metal layer, a second insulation layer disposed on the second metal layer, a pixel electrode layer and an intervening layer. The first metal layer is disposed on the first substrate to form a signal wiring and a gate. The second metal layer is disposed on the first insulation layer to form a data wiring, a source and a drain. The intervening layer is a patterned layer and disposed between the second insulation layer and the pixel electrode layer. The pixel electrode layer covers the intervening layer and the second insulation layer, and the perimeter of the intervening layer of a sub-pixel ranges between 500 μm and 30000 μm.

12 Claims, 6 Drawing Sheets they yield of the LCD panels.

DISPLAY PANEL AND DISPLAY APPARATUS

CROSS REFERENCE TO RELATED APPLICATIONS

This Non-provisional application claims priority under 35 U.S.C. § 119(a) on Patent Application No(s). 201510461218.1 filed in People's Republic of China on Jul. 31, 2015, the entire contents of which are hereby incorporated by reference.

BACKGROUND

Technical Field

This disclosure relates to a display panel and a display apparatus that can improve the dark-state light leakage issue.

Related Art

With the development of technologies, flat display apparatuses have been widely applied to various fields. Due to the advantages such as low power consumption, less weight, compact size and less radiation, the liquid crystal display (LCD) apparatus has gradually replaced the traditional cathode ray tube display (CRT) display apparatus and been applied to various electronic products, such as mobile phones, portable multimedia devices, notebook computers, liquid crystal TVs and liquid crystal screens.

To enhance the wide viewing angle technology of the VA (vertical alignment) type LCD panel, the manufacturer of the display apparatus has utilized the photo-alignment technology to control the alignment direction of the liquid crystal molecules so as to improve the optical performance and the yield of the LCD panels.

The photo-alignment technology is to form the multi-domain alignment structures in each pixel of the panel. Thus, the liquid crystal molecules within the pixel will tilt to, for example, four different directions.

In the conventional technology, the pixel electrode of the VA-type LCD panel generally has a structure shaped like the symbol "*" ("*"-shaped) and is composed of a trunk portion and multiple branch or jag portions. The orientation of the tilt of the liquid crystal molecules can be controlled by properly designing the jag portions and the intervals therebetween.

SUMMARY

In comparison with the conventional LCD panel and display apparatus, this disclosure provides an LCD panel and display apparatus, which can improve the dark-state light leakage issue so as to enhance the contrast.

Therefore, a display panel includes a plurality of pixels, each of which includes a plurality of sub-pixels. The display panel includes a first substrate, a second substrate, a display medium layer, a first metal layer, a first insulation layer, a second metal layer, a second insulation layer, a pixel electrode layer and an intervening layer. The display medium layer is disposed between the first substrate and the second substrate. The first metal layer is disposed on the first substrate to form a signal wiring and a gate. The first insulation layer is disposed on the first metal layer. The second metal layer is disposed on the first insulation layer to form a data wiring, a source and a drain. The second insulation layer is disposed on the second metal layer. The intervening layer is a patterned layer and disposed between the second insulation layer and the pixel electrode layer. The pixel electrode layer covers the intervening layer and the second insulation layer, and the perimeter of the intervening layer of a sub-pixel ranges between 500 µm and 30000 µm.

In one embodiment, the intervening layer includes a trunk and a plurality of jags, the jags are connected to two sides of the trunk, and a maximum width of the trunk along a direction is between 1 µm and 20 µm.

In one embodiment, a minimum width of each of the jags is between 1 µm and 10 µm, and a minimum interval between two adjacent jags is between 1 µm and 10 µm.

In one embodiment, each of the jags and the trunk form an angle. Herein the angle is larger than or equal to 1° and is less than or equal to 44°, or the angle is larger than or equal to 46° and is less than or equal to 89°.

In one embodiment, the display panel further comprises a bulge layer disposed on the first substrate, and the intervening layer is disposed on and overlaps the bulge layer.

In one embodiment, a maximum width of the intervening layer along a direction is larger than a maximum width of the bulge layer along the direction.

In one embodiment, the display panel further comprises a thin film transistor including the gate, the source, the drain and a channel layer. The gate is disposed on the first insulation layer, the channel layer is disposed opposite the gate, the source and the drain contact the channel layer, and the bulge layer is formed by the same process as the gate, the source, the drain, the second insulation layer, the intervening layer or the pixel electrode layer.

In one embodiment, the intervening layer includes a trunk and a plurality of jags, the jags are connected to two sides of the trunk. The bulge layer is disposed between the second insulation layer and the trunk, or disposed at the edge of the intervening layer and between the second insulation layer and a part of the jags.

Moreover, a display apparatus has a plurality of pixels, each of which includes a plurality of sub-pixels. The display apparatus includes a display panel and a backlight module. The display panel includes a first substrate, a second substrate, a display medium layer, a first metal layer, a first insulation layer, a second metal layer, a second insulation layer, a pixel electrode layer and an intervening layer. The display medium layer is disposed between the first substrate and the second substrate. The first metal layer is disposed on the first substrate to form a signal wiring and a gate. The first insulation layer is disposed on the first metal layer. The second metal layer is disposed on the first insulation layer to form a data wiring, a source and a drain. The second insulation layer is disposed on the second metal layer. The intervening layer is a patterned layer and disposed between the second insulation layer and the pixel electrode layer. The pixel electrode layer covers the intervening layer and the second insulation layer, and the perimeter of the intervening layer of a sub-pixel ranges between 500 µm and 30000 µm. The backlight module is disposed opposite the display panel.

Summarily, in the display panel and the display apparatus of this disclosure, the first metal layer is disposed on the first substrate to form the signal wiring and the gates, the first insulation layer is disposed on the first metal layer, the second metal layer is disposed on the first insulation layer to form the data wiring, the sources and the drains, the second insulation layer is disposed on the second metal layer, and the intervening layer is a patterned layer and disposed between the second insulation layer and the pixel electrode layer. Moreover, the pixel electrode layer covers the intervening layer and the second insulation layer, and the perimeter of the intervening layer of a sub-pixel ranges between 500 µm and 30000 µm. Accordingly, the perimeter of the intervening layer in a sub-pixel can be decreased. For example, the perimeter of the intervening layer in a sub-pixel of the invention is only about 80% of that of the comparison example. Therefore, the dark-state light leakage issue of the display panel and the display apparatus of this disclosure can be reduced, and the contrast thereof can be enhanced.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
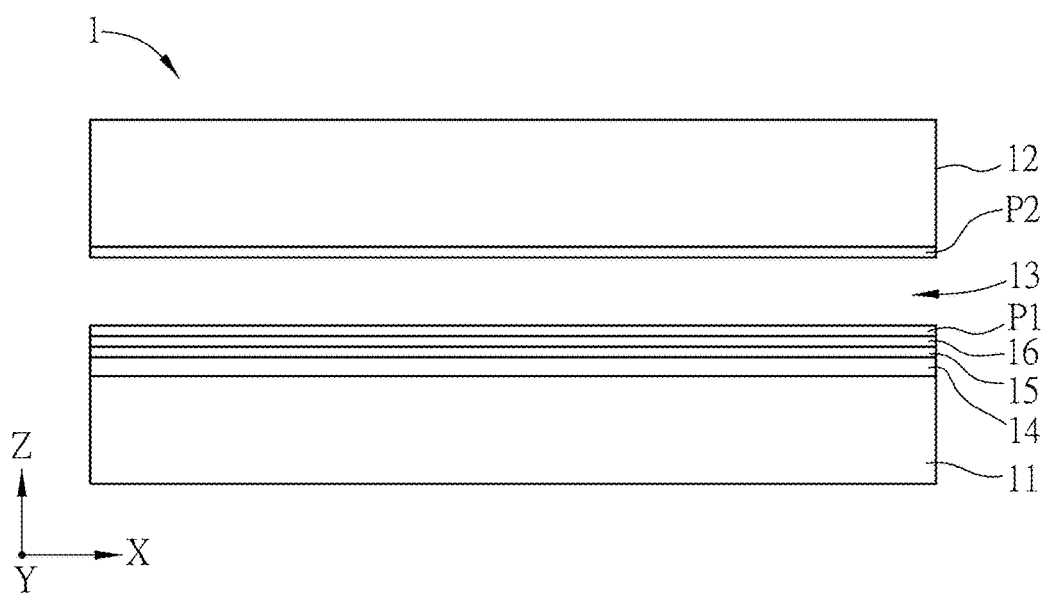
FIG. 1 is a schematic diagram of a display panel of an embodiment of this disclosure.
Figure 2A:
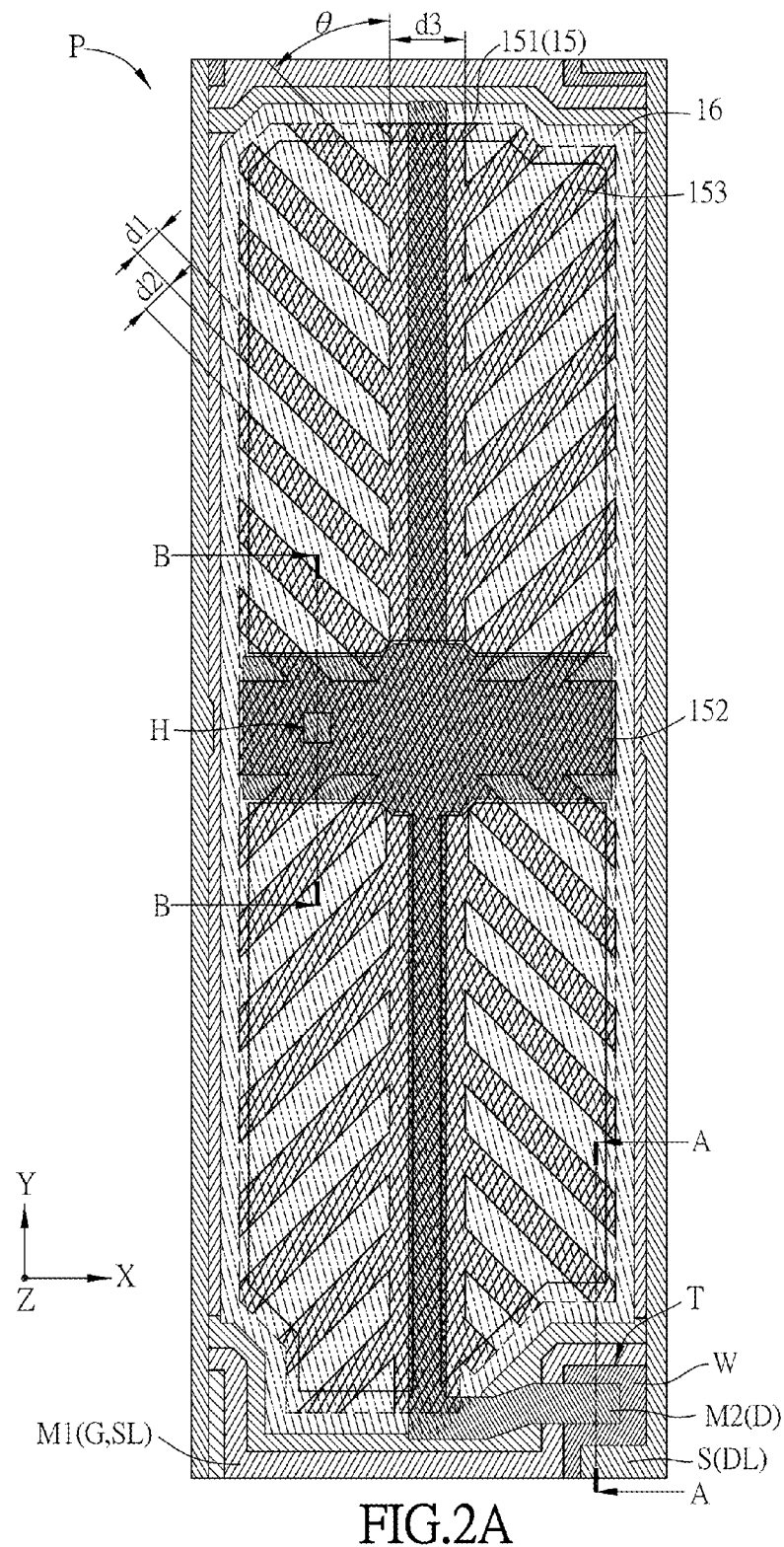
FIG. 2A is a schematic diagram of a sub-pixel structure of the display panel of FIG. 1.
Figure 2B:
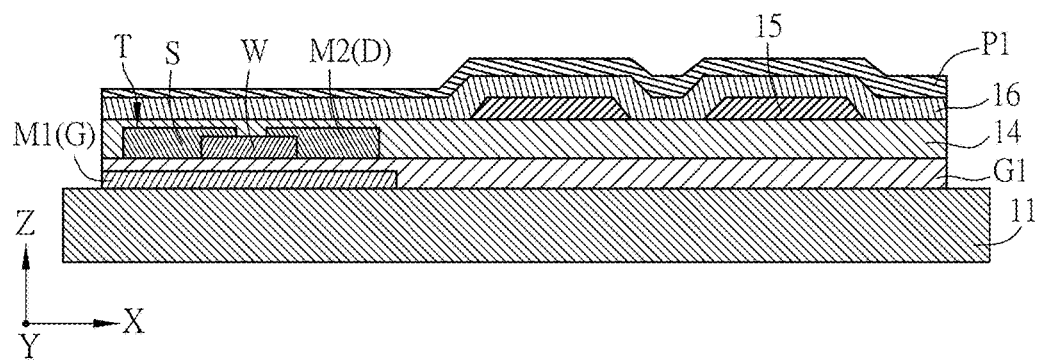
FIGS. 2B and 2C are schematic sectional diagrams taken along the line A-A and the line B-B in FIG. 2A, respectively.
Figure 2C:
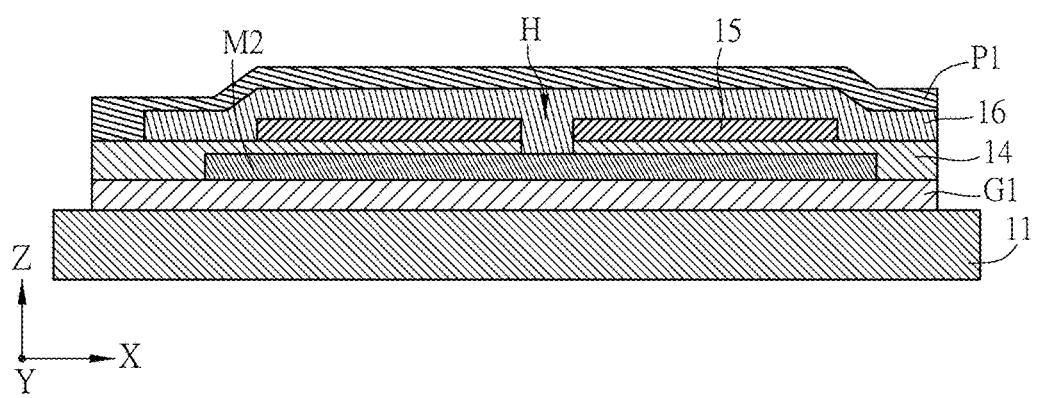

Refer to FIGS. 1 and 2A to 2C, wherein FIG. 1 is a schematic diagram of a display panel 1 of an embodiment of this disclosure, FIG. 2A is a schematic diagram of a sub-pixel structure P of the display panel 1 of FIG. 1, and FIGS. 2B and 2C are schematic sectional diagrams taken along the line A-A and the line B-B in FIG. 2A, respectively.

The display panel 1 includes a plurality of pixels and each of the pixels includes a plurality of sub-pixels (not shown). Herein, a sub-pixel is related to a sub-pixel structure P. A sub-pixel is related to a filter portion of the filter layer (such as a red filter portion R, a green filter portion G or a blue filter portion B). FIG. 2A only shows an intervening layer 15, a pixel electrode layer 16, a thin film transistor T, a scan line SL (the first metal layer M1) and a data line DL (the second metal layer M2) of the sub-pixel structure P without showing other film layers and substrates. Besides, for understanding this disclosure more easily, the following figures show a first direction X, a second direction Y and a third direction Z, which are substantially perpendicular to one another. The first direction X is substantially parallel to the extending direction of the scan line SL of the display panel 1, the second direction Y is substantially parallel to the extending direction of the data line DL of the display panel 1, and the third direction Z is another direction perpendicular to the first direction X and the second direction Y.

As shown in FIG. 1 and FIGS. 2A to 2C, the display panel 1 includes a first substrate 11, a second substrate 12 and a display medium layer 13. The display panel 1 further includes a first metal layer M1, a first insulation layer G1, a second metal layer M2, a second insulation layer 14, an intervening layer 15, a pixel electrode layer 16, a first alignment layer P1 and a second alignment layer P2.

The first substrate 11 and the second substrate 12 are disposed opposite to each other. The first substrate 11 or the second substrate 12 can be made of transparent material, such as glass, quartz or the likes, plastic material, rubber, glass fiber or other polymer materials. In this embodiment, the first substrate 11 and the second substrate 12 are both made of transparent glass for example. Moreover, the display panel 1 can further include a thin film transistor (TFT) array and a color filter (CF) array (not shown). The TFT array is disposed on a side of the first substrate 11 facing the second substrate 12. The CF array can be disposed on a side of the second substrate 12 facing the first substrate 11 or on a side of the first substrate 11 facing the second substrate 12. For example, the TFT array is disposed on the first substrate 11, which is called as a TFT substrate, and the CF array is disposed on the second substrate 12, which is called as a CF substrate. However, if a filter layer of the CF array (including the red, green and blue filter portions for example) is disposed on the first substrate 11, the first substrate 11 becomes a COA (color filter on array) substrate. Alternatively, if a black matrix of the CF array is disposed on the first substrate 11, the first substrate 11 becomes a BOA (BM on array) substrate. To be noted, this disclosure is not limited thereto.

The display medium layer 13 is disposed between the first substrate 11 and the second substrate 12, and it is also between the TFT array and the CF array. Herein, the display medium layer 13 is a liquid crystal layer and disposed between the first alignment layer P1 and the second alignment layer P2. The TFT array, the CF array and the display medium layer 13 can form a pixel array, which can include at least a sub-pixel structure P. For example, a plurality of sub-pixel structures P are arranged in columns and rows so as to form a matrix (not shown). Besides, the display panel 1 further includes a plurality of scan lines SL and a plurality of data lines DL, and the scan lines SL and the data lines DL cross each other to define the region of the sub-pixel structure P.

The second insulation layer 14 is disposed on the second metal layer M2. The intervening layer 15 is a patterned layer and disposed between the second insulation layer 14 and the pixel electrode layer 16. As shown in FIG. 2A, the intervening layer 15 of this embodiment includes a first trunk 151, a second trunk 152 and a plurality of jags 153. The first trunk 151 and the second trunk 152 cross each other and are disposed at the central part of the sub-pixel structure P. The jags 153 connect to two sides of each of the first trunk 151 and the second trunk 152 to form a "*"-shaped structure.

The pixel electrode layer 16 covers the intervening layer 15 and the second insulation layer 14. The first alignment layer P1 is disposed on the pixel electrode layer 16. The second alignment layer P2 is disposed on a side of the second substrate 12 facing the first substrate 11. In other words, as shown in FIGS. 2A and 2B, the second insulation layer 14 of this embodiment is a planarization layer, and the intervening layer 15 is a "*"-shaped patterned layer and disposed on the second insulation layer 14. In addition, the pixel electrode layer 16 of the sub-pixel structure P is a solid planar electrode (non-patterned) and entirely covers the intervening layer 15, so that the pixel electrode layer forms a three-dimensional electrode. Then, the first alignment layer P1 is disposed to cover the pixel electrode layer 16.

The material of the second insulation layer 14 can include organic or inorganic insulating material. Besides, the pixel electrode layer 16 can be a transparent electrode layer, the material of which can be, for example, ITO, IZO, AZO, CTO, $SnO_2$, ZnO, or other transparent conducting materials. The intervening layer 15 is made of transparent material, such as transparent electrode (e.g. ITO) or insulating material (e.g. SiOx or SiNx), or other transparent materials. The material of the first alignment layer P1 and the second alignment layer P2 is, for example but not limited to, polyimide (PI).

Comparing to the conventional VA-type LCD panel, which includes a "*"-shaped pixel electrode but is not configured with the intervening layer 15, the solid planar pixel electrode layer 16 of the sub-pixel structure P of this embodiment can enhance the intensity of the electric field when the sub-pixel is driven. The Ψ angle of the liquid crystal of this embodiment can be closer to 45 degrees and the θ angle thereof can be closer to 90 degrees in comparison with the PSVA (polymer stabilized vertically aligned) liquid crystal. Thus, the liquid crystal performance is improved.

As shown in FIGS. 2A to 2C, the sub-pixel structure P can further include a thin film transistor, and the second insulation layer 14 covers the thin film transistor T. The thin film transistor T is disposed on the substrate 11 and includes a gate G, a source S, a drain D and a channel layer W. The gate G is disposed on the first substrate 11 and opposite the channel layer W. The gate G can be a single-layer or multi-layer structure made of metal (such as aluminum, copper, silver, molybdenum, or titanium) or alloy. A part of the wires for transmitting driving signals, for example the scan lines SL, can be the same layer made in the same process as the gate G (i.e. the first metal layer M1), and they are electrically connected with each other. In other words, the first metal layer M1 is disposed on the first substrate 11 to form the signal wiring (i.e. the scan lines SL) and the gate G The channel layer W is disposed with respect to the gate G and located on the first insulation layer G1. In practice, the channel layer W is a semiconductor layer and made of, for example but not limited to, polysilicon material. The material of the channel layer W includes, for example but is not limited to, an oxide semiconductor. The said oxide semiconductor includes an oxide, and the oxide includes one of indium, gallium, zinc and tin and is IGZO (indium gallium zinc oxide) for example. The source S and the drain D are disposed on the channel layer W and contact the channel layer W. When the channel layer W of the thin film transistor T is not enabled, the source S and the drain D are electrically isolated from each other. Each of the source S and the drain D can be a single-layer or multi-layer structure made of metal (such as aluminum, copper, silver, molybdenum, or titanium) or alloy. A part of the wires for transmitting driving signals, for example the data lines DL, can be the same layer made in the same process as the source S and the drain D (i.e. the second metal layer M2). In other words, the second metal layer M2 is disposed on the first insulation layer G1 to form the data wiring (i.e. the data lines DL), the source S and the drain G.

To be noted, in this embodiment, the source S and the drain D are directly disposed on the channel layer W instead of through an etch stop layer. In other embodiments, however, the source S and the drain D of the thin film transistor T may be disposed on the etch stop layer while one end of each of the source S and the drain D contacts the channel layer W through an opening of the etch stop layer. The material of the etch stop layer can be, for example, organic material such as organic silicon oxide, or the single-layer inorganic material such as silicon nitride, silicon oxide, silicon oxynitride, silicon carbide, aluminum oxide, hafnium oxide. Or, the etch stop layer can be a multi-layer structure with the material of the combination of the above-mentioned materials.

When the scan lines SL of the display panel 1 sequentially receive a scan signal, the thin film transistors T relevant to the scan lines SL can be enabled and then the data signals relevant to the sub-pixel structures P can be transmitted to the relevant pixel electrodes through the data lines DL and the source S, the drain D and a via H, so that the display panel 1 can display images. In this embodiment, the gray-level voltages can be transmitted to the pixel electrode layers 16 of the relevant sub-pixel structures P through the relevant data lines DL, so that each of the pixel electrode layer 16 and another electrode (not shown) disposed between the pixel electrode layer 16 and the second substrate 12 can form an electric field to drive the relevant liquid crystal molecules in the display medium layer 13 to modulate the light, and then the display panel 1 can display images accordingly.

Herein, a display panel of a comparative embodiment is provided first, and the display panel of the comparative embodiment (which is not shown but can be comprehended by referring to FIGS. 1 and 2A to 2C) is similar to the structure of the above-mentioned display panel 1.

Similar to the display panel 1 of the above embodiment, the display panel of the comparative embodiment also includes the first substrate, the second substrate and the display medium layer. Furthermore, it includes the first metal layer, the first insulation layer, the second metal layer, the second insulation layer, the intervening layer, the pixel electrode layer, the first alignment layer and the second alignment layer.

The first substrate and the second substrate are disposed oppositely, and the display medium layer is disposed between the first substrate and the second substrate. The second insulation layer is disposed on the second metal layer. The intervening layer is a patterned layer and disposed between the second insulation layer and the pixel electrode layer. The intervening layer includes a first trunk, a second trunk and a plurality of jags. The first trunk and the second trunk cross each other and they are disposed at the central part of the sub-pixel structure of the display panel. The jags are connected to two sides of each of the first trunk and the second trunk to form a "*"-shaped structure. The pixel electrode layer covers the intervening layer and the second insulation layer. The first alignment layer is disposed on the pixel electrode layer, and the second alignment layer is disposed on a side of the second substrate facing the first substrate. The intervening layer is a "*"-shaped patterned layer and disposed on the second insulation layer. The pixel electrode layer of the sub-pixel structure is a solid planar electrode (non-patterned) and entirely covers the intervening layer so that the pixel electrode layer forms a three-dimensional electrode. Then, the first alignment layer is disposed to cover the pixel electrode layer. Besides, in the display panel of the comparative embodiment, the perimeter of the intervening layer of a sub-pixel is between 600 μm and 32500 μm. Moreover, other technical features of the elements of the display panel of the comparative embodiment can be comprehended by referring to the above illustration and therefore are not described here for conciseness.

Comparing to the conventional VA-type LCD panel, which includes a "*"-shaped pixel electrode but is not configured with the intervening layer, the solid planar pixel electrode layer of the sub-pixel structure of the comparative embodiment can enhance the intensity of the electric field when the sub-pixel is driven. The Ψ angle of the liquid crystal of this embodiment can be closer to 45 degrees and the θ angle thereof can be closer to 90 degrees in comparison with the PSVA (polymer stabilized vertically aligned) liquid crystal. Thus, the liquid crystal performance is improved.

As shown in FIGS. 1 and 2A to 2C, because the solid planar pixel electrode layer 16 of a sub-pixel covers the patterned intervening layer 15, the part of the pixel electrode layer 16 covering the intervening layer 15 and the part of the pixel electrode layer 16 not covering the intervening layer 15 has a height gap so that the portion therebetween forms an inclined border. This inclined border has a larger inclination than that of the VA-type product, which includes a "*"-shaped pixel electrode and is not configured with the intervening layer 15, so that the pre-tilt angle of the liquid crystal molecules is increased (from 19.98° to 35.84° for example) resulting in a worse dark-state light leakage. The dark-state light leakage generally occurs at the following locations and situations. The first is the border part of the patterned intervening layer 15 (i.e. the border between the part of the pixel electrode layer 16 covering the intervening layer 15 and the part of the pixel electrode layer 16 not covering the intervening layer 15). Second, if the angle between the first trunk 151 (or the second trunk 152) and the jag 153 is 45°, the light leakage issue at the border part of the intervening layer 15 becomes worse. This is because the inclined border formed on the border part of the above intervening layer 15 with the included angle of 45° between the first trunk 151 and the jag 153 can cause the maximum phase difference caused by the tilt direction of the liquid crystal, so that the light leakage issue becomes worse.

Figure 5:
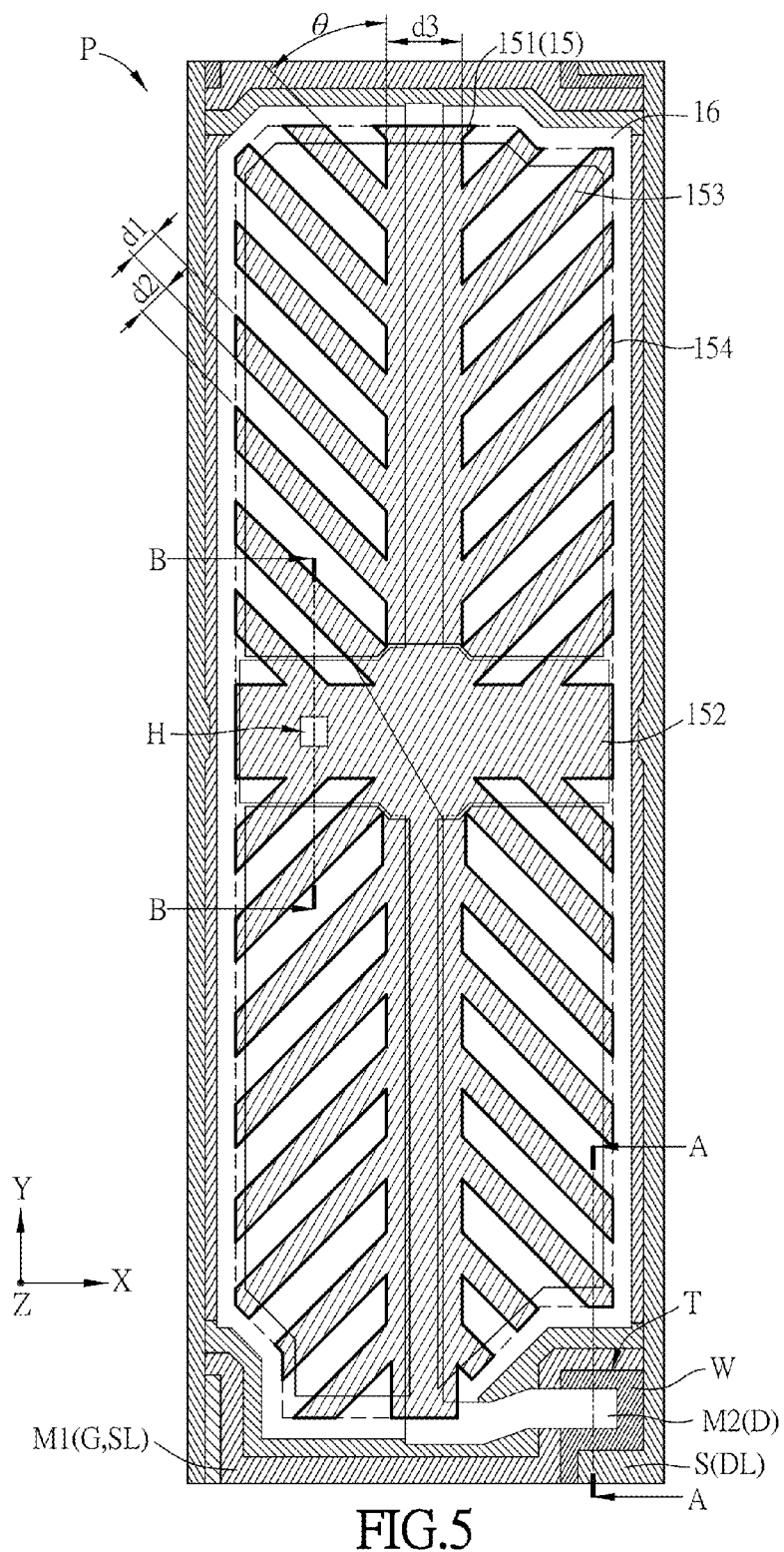
FIG. 5 is a schematic diagram of a sub-pixel structure of the display panel of FIG. 2A for clearly showing the perimeter of the intervening layer.

Therefore, in the embodiment of FIGS. 1 and 2A to 2C, in comparison with the above-mentioned comparative embodiment, the border length of the intervening layer 15 can be reduced by decreasing the perimeter of the intervening layer 15 of a sub-pixel (e.g. about 80% of the perimeter of the comparative embodiment), so as to reduce the dark-state light leakage of the display panel 1. In FIG. 5, the perimeter of the intervening layer 15 is shown by bold lines and denoted by the numeral 154, wherein the cross-hatching of the pixel electrode layer 16 and second metal layer M2 within the area defined by the data lines DL and the scan lines SL is cancelled so as to clearly showing the perimeter 154 of the intervening layer 15. Besides, the perimeter 154 of the intervening layer 15 refers to the sum of the lengths of all the bold lines.

With the display panels of different sizes and different resolutions in the market, the following is a further requirement in comparison with the comparative embodiment. For the display panels of different sizes, the perimeter of the intervening layer 15 of a sub-pixel structure P needs to range between 500 μm and 30000 μm (500 μm the perimeter≤30000 μm), and this requirement can be achieved by the following techniques. First, since the dark-state light leakage mainly occurs at the border of the jag 153, decreasing the perimeter of the jag 153 can effectively reduce the ratio of the border where the light leakage occurs. Accordingly, in the same sub-pixel size, the perimeter of the intervening layer 15 can be reduced by increasing the width and interval of the jag 153 of the intervening layer 15. For example, as shown in FIG. 2A, under the case where the minimum width d1 of the jag 153 is the same as the minimum interval d2 between the two adjacent jags 153 (d1=d2), increasing the interval d2 of the two adjacent jags 153 (or the width d1) can reduce the border ratio of the jag 153. Herein, for the different sub-pixel sizes, the minimum width d1 of the jag 153 of the intervening layer 15 of the display panel 1 of this disclosure is limited to between 1 μm and 10 μm and the minimum interval d2 between the two adjacent jags 153 is limited to between 1 μm and 10 μm. Accordingly, the border ratio of the jag 153 can be reduced and then the perimeter of the intervening layer 15 can be decreased.

Second, for the same sub-pixel size, increasing the area (such as the width) of the first trunk 151 (or the second trunk 152) also can decrease the border of the jag 153, so as to reduce the dark-state light leakage. Herein, the maximum width d3 of the first trunk 151 of the intervening layer 15 of the display panel 1 along the first direction X is limited to between 1 μm and 20 μm. Accordingly, the border ratio of the jag 153 can be reduced and then the perimeter of the intervening layer 15 can be decreased.

In addition, another requirement is also provided in this embodiment to improve the light leakage. That is, the angle θ between each jag 153 and the trunk 151 (or 152) is not 45°. In other words, the angle θ in FIG. 2A is not equal to 45°, so that it needs to be larger than or equal to 1° and less than or equal to 44°, or larger than or equal to 46° and less than or equal to 89°. Because the angle between each jag 153 and the trunk 151 (or 152) is not 45°, the maximum phase difference for the tilt direction of the liquid crystal resulted from the inclination of the 45° orientation won't happen, and therefore the light leakage can be reduced.

Besides, because the slope of the potential line of the border between the part of the pixel electrode layer 16 covering the intervening layer 15 and the part of the pixel electrode layer 16 not covering the intervening layer 15 is more gentle than the PSVA-type product when the sub-pixel structure P of FIGS. 2A and 2B is provided with the voltage to generate the electric field, the stability of the stable-state dark fringes becomes worse and therefore the texture of the dark fringes is easily incomplete after the subsequent curing process.

Figure 3A:
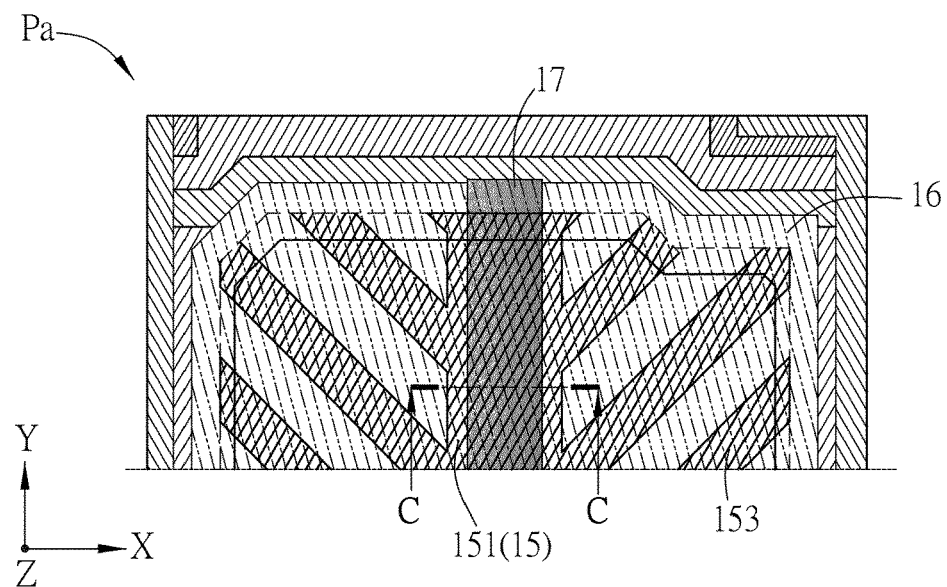
FIG. 3A is a schematic diagram of a part of the sub-pixel structure of another embodiment of the display panel of this disclosure.
Figure 3B:
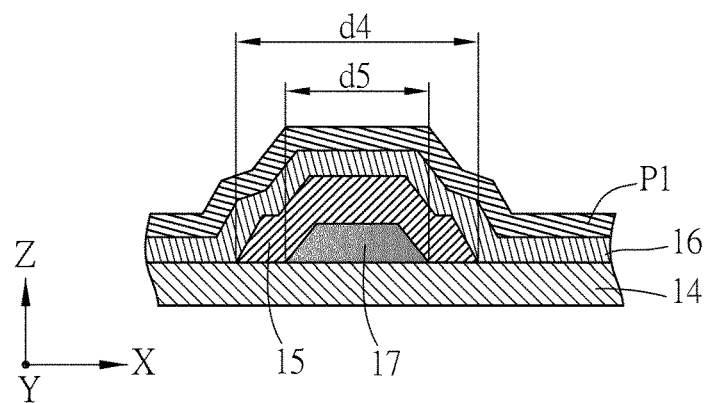
FIG. 3B is a schematic sectional diagram taken along the line C-C in FIG. 3A.
Figure 3C:
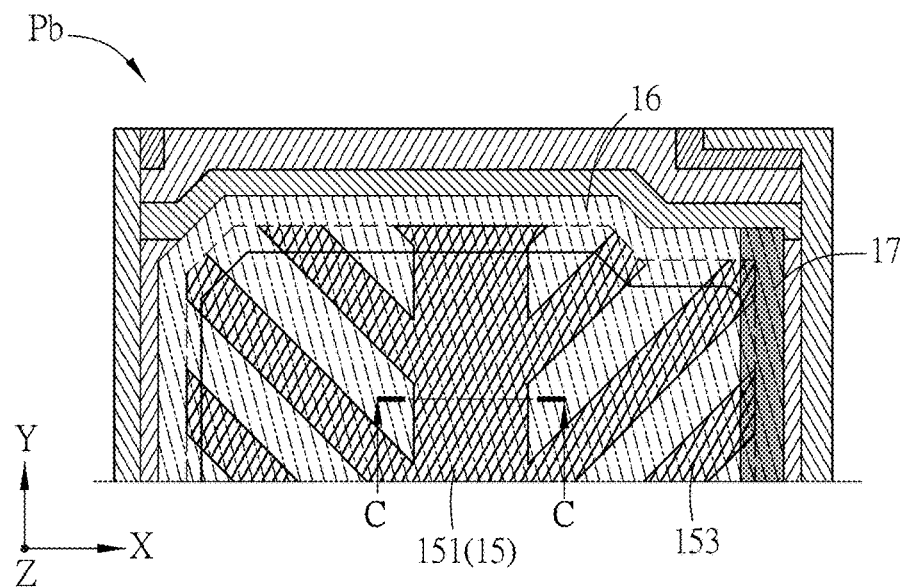
FIG. 3C is a schematic diagram of a part of the sub-pixel structure of another embodiment of the disclosure.

Refer to FIGS. 3A to 3C, to solve the above-mentioned problem. FIG. 3A is a schematic diagram of a part of the sub-pixel structure Pa of another embodiment of the display panel 1 of this disclosure, FIG. 3B is a schematic sectional diagram taken along the line C-C in FIG. 3A, and FIG. 3C is a schematic diagram of a part of the sub-pixel structure Pb of another embodiment of the disclosure. For clearly illustrating, FIGS. 3A and 3B just shows, in comparison with FIGS. 2A and 2B, a part of the sub-pixel structure Pa without showing the second metal layer M2 disposed under the first trunk 151.

As shown in FIGS. 3A and 3B, one difference between the sub-pixel structure Pa and the sub-pixel structure P is that the sub-pixel structure Pa of the display panel 1 further includes a bulge layer 17. The bulge layer 17 is disposed on the first substrate 11, and the intervening layer 15 is disposed on and overlaps the bulge layer 17. The bulge layer 17 of this embodiment is disposed between the second insulation layer 14 and the intervening layer 15, so that the intervening layer 15 is disposed on and overlaps the bulge layer 17. The bulge layer 17 can be disposed between the second insulation layer 14 and the first trunk 151 (or the second trunk 152), or disposed at the edge of the intervening layer 15 and between the second insulation layer 14 and the jag 153. As shown in FIG. 3A, the bulge layer 17 of this embodiment is disposed between the second insulation layer 14 and the first trunk 151. As shown in FIG. 3B, a maximum width d4 of the intervening layer 15 along the first direction X is larger than a maximum width d5 of the bulge layer 17 along the first direction X, whereby the intervening layer 15 still can completely cover the bulge layer 17 even if the process variation occurs. To be noted, the bulge layer 17 can be formed by the same process as the gate G, the source S or the drain D of the thin film transistor T, the second insulation layer 14, the intervening layer 15 or the pixel electrode layer 16, so that a photomask can be saved and the cost can be lowered down.

As shown in FIG. 3C, one difference between the sub-pixel structure Pb and the sub-pixel structure Pa is that the bulge layer 17 of the sub-pixel structure Pb is disposed at the edge of the intervening layer 15 and between the second insulation layer 14 and a part of the jag 153. However, in other embodiments, the bulge layer 17 may be disposed between the second insulation layer 14 and the first trunk 151 (or the second trunk 152), at the edge of the intervening layer 15 and between the second insulation layer 14 and a part of the jag 153.

Moreover, other technical features of the sub-pixel structures Pa and Pb can be comprehended by referring to the same elements of the sub-pixel structure P and therefore are not described here for conciseness.

Accordingly, in the sub-pixel structure Pa, the bulge layer 17 can be added and disposed under the "*"-shaped first trunk 151 (or the second trunk 152) of the intervening layer 15. Or, in the sub-pixel structure Pb, the bulge layer 17 can be added and disposed under the edge of the intervening layer 15 (between the second insulation layer 14 and a part of the jags 153). Thereby, as shown in FIG. 3B, the intervening layer 15 and the pixel electrode layer 16 can form an at least two-stair ladder-shaped structure. Therefore, the electric-field gradient can be enhanced and then the control force to the liquid crystal thereat can be intensified, so that the stability of the dark fringes can be raised after the subsequent curing process.

Figure 4:
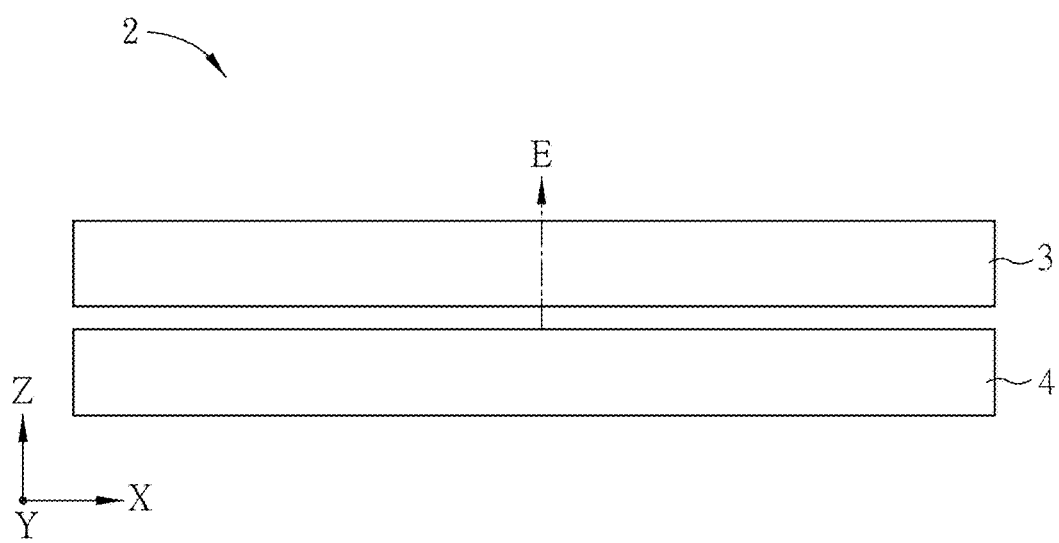
FIG. 4 is a schematic diagram of a display apparatus of an embodiment of this disclosure.

Moreover, refer to FIG. 4, which is a schematic diagram of a display apparatus 2 of an embodiment of this disclosure.

The display apparatus 2 includes a display panel 3 and a backlight module 4 disposed opposite the display panel 3. The display panel 3 has the all features of the above-mentioned display panel 1 and its variations and therefore is not described here for conciseness. When the backlight module 4 emits the light E passing through the display panel 3, the pixels (or sub-pixels) of the display panel 3 display colors forming images.

Summarily, in the display panel and the display apparatus of this disclosure, the first metal layer is disposed on the first substrate to form the signal wiring and the gates, the first insulation layer is disposed on the first metal layer, the second metal layer is disposed on the first insulation layer to form the data wiring, the sources and the drains, the second insulation layer is disposed on the second metal layer, and the intervening layer is a patterned layer and disposed between the second insulation layer and the pixel electrode layer. Moreover, the pixel electrode layer covers the intervening layer and the second insulation layer, and the perimeter of the intervening layer of a sub-pixel ranges between 500 μm and 30000 μm. Accordingly, the perimeter of the intervening layer in a sub-pixel can be decreased. For example, the perimeter of the intervening layer in a sub-pixel of the invention is only about 80% of that of the comparison example. Therefore the dark-state light leakage issue of the display panel and the display apparatus of this disclosure can be reduced, and the contrast thereof can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel including a plurality of pixels, each of which includes a plurality of sub-pixels, the display panel comprising:
    a first substrate;
    a second substrate;
    a display medium layer disposed between the first substrate and the second substrate;
    a first metal layer disposed on the first substrate to form a signal wiring and a gate;
    a first insulation layer disposed on the first metal layer;
    a second metal layer disposed on the first insulation layer to form a data wiring, a source and a drain;
    a second insulation layer disposed on the second metal layer;
    a pixel electrode layer electrically connecting to the drain;
    an intervening layer being a patterned layer disposed between the second insulation layer and the pixel electrode layer, wherein the intervening layer comprises a top surface and two sidewalls; and
    a bulge layer disposed on the first substrate, wherein the intervening layer is disposed on and overlaps the bulge layer;
    wherein the pixel electrode layer contacts the intervening layer and the second insulation layer; the pixel electrode layer entirely covers the top surface and the two sidewalls, and the perimeter of the intervening layer of a sub-pixel ranges between 500 μm and 30000 μm,
    wherein the intervening layer includes a trunk and a plurality of jags, the jags are connected to two sides of the trunk, wherein the bulge layer is disposed between the second insulation layer and the trunk, or disposed at the edge of the intervening layer and between the second insulation layer and a part of the jags.

2. The display panel as recited in claim 1, wherein a maximum width of the trunk along a direction is between 1 μm and 20 μm.

3. The display panel as recited in claim 2, wherein a minimum width of each of the jags is between 1 μm and 10 μm, and a minimum interval between two adjacent jags is between 1 μm and 10 μm.

4. The display panel as recited in claim 2, wherein each of the jags and the trunk form an angle, wherein the angle is larger than or equal to 1° and is less than or equal to 44°, or the angle is larger than or equal to 46° and is less than or equal to 89°.

5. The display panel as recited in claim 1, wherein a maximum width of the intervening layer along a direction is larger than a maximum width of the bulge layer along the direction.

6. The display panel as recited in claim 1, further comprising:
    a thin film transistor including the gate, the source, the drain and a channel layer, wherein the gate is disposed on the first insulation layer, the channel layer is disposed opposite the gate, the source and the drain contact the channel layer, and the bulge layer is formed by the same process as the gate, the source, the drain, the second insulation layer, the intervening layer or the pixel electrode layer.

7. A display apparatus including a plurality of pixels, each of which includes a plurality of sub-pixels, the display apparatus comprising:

a display panel including a first substrate, a second substrate, a display medium layer, a first metal layer, a first insulation layer, a second metal layer, a second insulation layer, a pixel electrode layer, a bulge layer and an intervening layer, wherein the display medium layer is disposed between the first substrate and the second substrate, the first metal layer is disposed on the first substrate to form a signal wiring and a gate, the first insulation layer is disposed on the first metal layer, the second metal layer is disposed on the first insulation layer to form a data wiring, a source and a drain, and the drain electrically connects to the pixel electrode layer, the second insulation layer is disposed on the second metal layer, the intervening layer is a patterned layer disposed between the second insulation layer and the pixel electrode layer, and the intervening layer comprises a top surface and two sidewalls, the pixel electrode layer contacts the intervening layer and the second insulation layer; the pixel electrode layer entirely covers the top surface and the two sidewalls, and the perimeter of the intervening layer of a sub-pixel ranges between 500 μm and 30000 μm; and a backlight module disposed opposite the display panel, wherein the bulge layer is disposed on the first substrate, and the intervening layer is disposed on and overlaps the bulge layer, wherein the intervening layer includes a trunk and a plurality of lags, the jags are connected to two sides of the trunk, wherein the bulge layer is disposed between the second insulation layer and the trunk, or disposed at the edge of the intervening layer and between the second insulation layer and a part of the jags.

8. The display apparatus as recited in claim 7, wherein a maximum width of the trunk along a direction is between 1 μm and 20 μm.

9. The display apparatus as recited in claim 8, wherein a minimum width of each of the jags is between 1 μm and 10 μm, and a minimum interval between two adjacent jags is between 1 μm and 10 μm.

10. The display apparatus as recited in claim 8, wherein each of the jags and the trunk form an angle, wherein the angle is larger than or equal to 1° and is less than or equal to 44°, or the angle is larger than or equal to 46° and is less than or equal to 89°.

11. The display apparatus as recited in claim 7, wherein a maximum width of the intervening layer along a direction is larger than a maximum width of the bulge layer along the direction.

12. The display apparatus as recited in claim 7, wherein the display panel further comprises:

a thin film transistor including the gate, the source, the drain and a channel layer, wherein the gate is disposed on the first insulation layer, the channel layer is disposed opposite the gate, the source and the drain contact the channel layer, and the bulge layer is formed by the same process as the gate, the source, the drain, the second insulation layer, the intervening layer or the pixel electrode layer.

* * * * *